United States Patent Office 3,523,024
Patented Aug. 4, 1970

3,523,024
MALIC ACID AND PROCESS OF
MAKING THE SAME
Glenn A. Nesty, Morristown, N.J., assignor to Allied
Chemical Corporation, New York, N.Y., a corporation
of New York
No Drawing. Filed July 21, 1966, Ser. No. 566,773
Int. Cl. C07c 59/12
U.S. Cl. 99—78                                    12 Claims

ABSTRACT OF THE DISCLOSURE

A food acidulant consisting essentially of malic acid with a minor amount of succinic acid. The acidulant is produced by subjecting a solution of malic acid containing maleic and/or fumaric acid to convert the unsaturated carboxylic acids to succinic acid.

This invention relates to the purification of malic acid, a new malic acid composition and a method for preparing the same. More particularly it relates to the preparation of malic acid substantially free from maleic and/or fumaric acids.

Malic acid is a particularly desirable food acidulant because of its high solubility in water, smooth tart taste, and unusual taste-blending and flavor fixing qualities. However when malic acid is prepared by the usual and economical procedure of hydrating maleic and/or fumaric acid, it is always contaminated by some maleic acid which is highly toxic to warm-blooded animals, and consequently the presence of maleic acid even in minor quantities is objectionable in products designed for human consumption.

Malic acid prepared in this way is also usually contaminated with fumaric acid which can have an adverse effect on the physical properties of malic acid particularly with regard to its solubility.

The chemical synthesis of d,l-malic acid by hydration of maleic acid is well-known and is believed to proceed both by the direct conversion of maleic acid to malic acid, and in stepwise manner by the isomerization of maleic acid to fumaric acid followed by hydration of the fumaric acid to malic acid. These reactions are generally carried out in aqueous media, at elevated temperatures, i.e., above 150° C. and under superatmospheric pressures, i.e., above about 10 atmospheres. The product of these reactions is an equilibrium mixture of maleic, fumaric and malic acids. The major portion of the fumaric acid can be separated from the crude malic acid by crystallization, in view of the relatively low solubility of fumaric acid in aqueous media. However, the complete removal of fumaric acid is complicated by the rather significant solubility of fumaric acid in concentrated aqueous malic acid solutions, especially at room temperature and above, and also by the reversible character of the hydration of fumaric acid. Although the latter complication does not assume major proportions at temperatures below about 70° C., this requires exercise of efficient control during the evaporation of the concentrated malic acid solutions prior to the isolation of pure malic acid therefrom.

The crude malic acid mixture also contains small but significant amounts of maleic acid, generally in the range of 2 to 3%. In view of the toxicity of maleic acid as mentioned above, it is imperative to remove it from malic acid which is to be used as a food additive. Maleic acid is relatively soluble in water and hence is difficult to remove from the crude malic acid mixture, and even careful crystallization does not separate it completely.

Methods heretofore practiced for purification of malic acid are generally tedious, expensive, and usually incur substantial losses of the desired malic acid. According to one method, malic acid is separated from minor amounts of fumaric and maleic acids by conversion of these acids to their calcium salts. Calcium malate precipitates and is filtered from the mother liquor containing most, but not all, of the fumaric and maleic acids as well as a not inconsiderable portion of the malic acid (about 15 to 20%). Thereafter, the calcium malate is digested with sulfuric acid, and after removal of the solid calcium sulfate and excess sulfate ions by addition of barium carbonate and oxalic acid, the malic acid is recovered by evaporation and crystallization from the mother liquor. As can be seen, such a purification procedure is time consuming, costly and only moderately effective.

The principal object of this invention is to provide a malic acid composition which is free of toxic acids and which has good physical characteristics and excellent taste qualities when used as a food acidulant.

Another principal object of this invention is to provide an effective and economical process for the manufacture of malic acid having the above-mentioned desirable properties.

A further object of the invention is to provide malic acid substantially free from fumaric and maleic acids and suitable for human consumption.

Still another object is to provide an effective and economical process for the preparation of malic acid substantially free from fumaric and maleic acids and suitable for human consumption.

Other objects will be apparent from the following description of my invention.

In accordance with the present invention, I have discovered that a malic acid composition containing a major proportion of malic acid, a minor proportion of succinic acid and substantially free (i.e., containing less than 0.03%) of unsaturated acids (i.e., maleic and fumaric acids) has excellent characteristics for use as a food acidulant.

I have discovered that malic acid compositions containing about 0.5 to about 5% by weight of succinic acid have generally improved physical characteristics and a beneficial effect on the taste of foods when this material is employed as a food-acidulant. When malic acid contains less than about 0.5% by weight of succinic acid there is not much discernible improvement in these properties and while more than 5% by weight of succinic acid can be employed in malic acid compositions there are no special advantages of such composition and there may be some disadvantages particularly where the physical characteristics are concerned.

Malic acid containing up to about 5% by weight of succinic acid is very soluble in water, forming a true solution even at room temperature, which is highly desirable in a food additive. Further, the addition of succinic acid to malic acid results in a decrease in the hygroscopicity of the product.

Further, I have discovered that this novel composition can be efficiently and economically obtained by contacting a concentrated aqueous malic acid solution containing maleic and fumaric acids with hydrogen in the presence of a metal hydrogenating catalyst. Malic acid solutions containing about 30% or more of malic acid and contaminated with about 5% or less (all percentages used herein are by weight) of unsaturated acids can be rapidly and substantially completely free of unsaturated acids by passing hydrogen gas into the malic acid solution to which a metal hydrogenation catalyst has been added. The unsaturated acids are substantially completely converted to succinic acid. The malic acid product obtained in this way contains about 0.5 to 5% by weight of succinic acid and less than 0.03% by weight of unsaturated acids. Succinic acid like malic acid is a physiological compound which occurs naturally in human metabolism and takes part in the metabolic pathway commonly known as the Krebs cycle. Succinic acid is also found naturally in many foods such as broccoli, rhubard and sugar beets.

The hydrogenating metal catalysts and methods for preparing them are well known. Of these palladium, rhodium, ruthenium, rubidium, platinum, iridium, nickel and cobalt, in the form of free metals, their oxides and various salts thereof, alone or in admixture of two or more of such catalysts are typical metal hydrogenation catalysts suitable for use in the novel process of this invention. As is customary in this art, such catalysts are usually employed in the form of supported catalysts, i.e., the catalyst is dispersed or absorbed on the surface of support material, commonly called "the carrier," such as for example, charcoal, aluminum oxide, calcium carbonate, barium sulfate, and the like. The concentration of the catalystic substance on the carrier or support is not critical and is usually in the range of about 1% to about 10% on the weight of the support. The amount of catalyst used in the process of my invention is not critical and can vary from about 0.1% to 10% or more on the weight of the malic acid being purified. A satisfactory and commercially available metal hydrogenation catalyst contains 5% palladium on a charcoal carrier. Preferably from about 0.2 to 5.0% of such a catalyst is used.

The temperature at which my novel process is carried out is not critical and can be varied over a broad range. Temperatures from ambient to about 100° C. are suitable, the rate varying directly with the temperature. Generally, a temperature within the range of about 25° to about 50° C. is preferred. Higher temperatures while resulting in higher rates of hydrogenation also increase the rate of the malic acid dehydration reaction, which becomes significant at about 100° C.

The pressure used in the process of my invention is not critical, also, and may be varied over a broad range, from atmospheric to 200 pounds per square inch, "p.s.i.," or more. As in the instance of the temperature, I have found that the hydrogenation rate varies directly with the pressure applied. Although ambient conditions of pressure and temperatures results in a convenient rate of reaction, i.e., a reaction time of several hours, I prefer to utilize low superatmospheric pressures, e.g., within the range of about 40 to about 150 p.s.i. when operating within the preferred temperature range of about 25° to about 50° C. Under such conditions, the hydrogenation of the unsaturated acids normally present in the crude malic acid solution can be removed substantially completely in from ½ to about 3 hours, depending upon the activity of the catalyst.

The novel process can be carried out batchwise or continuously and in apparatus which is usual for such processes and known to those skilled in this art.

The process of my invention is of special value as a step in the manufacture of malic acid derived from maleic acid. In such processes concentrated maleic and/or fumaric acid is heated under pressure of at least 150 p.s.i. and preferably about 200–260 p.s.i. at temperatures above 150° C., preferably about 160–250° C. to obtain mixtures comprising in total acid content about 40 to 60% malic acid, 40% to 60% fumaric acid and about 2 to 3% maleic acid. This solution or slurry is concentrated to further precipitate fumaric acid which is separated by filtration or centrifugation or other suitable means. The filtrate which contains about 40 to 70% by weight of malic acid is cooled to crystallize malic acid which may be further purified by solution in water, filtration from fumaric acid, concentration and crystallization. Such a process, operated on a continuous basis and resulting a product containing less than 7500 parts per million ("p.p.m.") of fumaric acid and less than 500 p.p.m. of maleic acid is disclosed in copending U.S. application Ser. No. 520,477, filed Jan. 12, 1966, now U.S. Pat. 3,391,187 issued July 2, 1968.

In accordance with a preferred mode of carrying out the process of my invention, the crude malic acid solution after separation of solid fumaric acid, but still containing significant amounts (about 0.5 to 5%) of unsaturated acids, is directed to a hydrogenation tower, mixed with an aqueous slurry of 5% palladium on carbon catalyst and hydrogen is passed into the slurry in amount sufficient to convert substantially all of the unsaturated acids to succinic acid. The mass is maintained at 30° to 60° C. and at slightly above atmospheric pressure during the hydrogenation. Thereafter the mixture is passed through a filter to remove catalyst, and a decolorizing carbon tower to remove colored impurities. The decolorized solution may then be treated by contact with first a cationic exchange resin followed by an anionic exchange resin to remove remaining trace amounts of maleic and fumaric acids, as disclosed in copending application Ser. No. 419,540, filed Dec. 18, 1964, now U.S. Pat. 3,371,112 issued Feb. 27, 1968, and the resultant solution may be spray dried to obtain malic acid substantially free from unsaturated acids and containing about 0.5 to about 5% by weight of succinic acid, or malic acid may be obtained by other methods obvious to those skilled in the art.

If desired, the maleic acid may be further purified before undergoing hydrogenation, as by crystallization, solution in water and filtration from fumaric acid as described above.

The following examples describe specific embodiments of my invention and illustrate the best method contemplated for carrying it out; but they are not to be interpreted as limiting the invention to all details thereof since changes can be made without departing from the scope or spirit of my invention. Temperatures are given in degrees centigrade and parts and percentages are by weight, unless otherwise designated.

EXAMPLE 1

A solution of crude malic acid was obtained by heating a 50% aqueous solution of maleic acid in an autoclave under pressure of 153–157 p.s.i. at a temperature of 200° C. for about 3 hours. The resultant slurry containing 3,130 parts of malic acid, 70 parts of maleic acid, 2,525 parts of fumaric acid and 4,675 parts of water was cooled to about 130° C. and then fed to an evaporator maintaining at about 45° C. to 50° C. to remove 1,475 parts of water. The mixture was then filtered to remove solid fumaric acid.

The liquor, which after the filtration contained 2500 parts of malic acid, 55 parts of maleic acid, 25 parts of fumaric acid and 2600 parts of water was passed through a seven stage hydrogenation tower, continuously, the liquor being maintained at about 50° and under about 100 p.s.i. and at a flow rate such that a residence time of about 30 to 60 minutes was obtained. Simultaneously, an aqueous slurry of 5% palladium on charcoal at the rate of 1.0 part per hour was added to the solution, while hydrogen at the rate of 360 cubic feet per hour (or about 2 parts), representing about 150% of the required amount was bubbled into the mixture. The resultant mixture was filtered to remove the solid catalyst and the filtrate passed through a decolorizing carbon. The clarified and decolorized solution was filtered and passed through a cation exchanger and then an anionic exchange column.

The solution, which contained 2425 parts of malic acid and 75 parts of succinic acid dissolved in 2500 parts of water was sprayed dried. The dried material was separated in an air classifier from about 500 parts of "fines," which were redissolved in an equal weight of water and added to the solution being dried. The dried material, free from fines and from unsaturated acids, was malic acid containing 3% of succinic acid; 40 grams of this material was completely soluble in 100 cc. of water at ambient temperature.

EXAMPLES 2-6

A solution, of malic acid containing 0.43% of unsaturated acids, 1.2% malo-malic acid and 53.07% total acids was reduced with hydrogen in a Parr hydrogenator in the presence of 5% palladium on carbon catalyst. A series of such hydrogenations were carried out at various temperatures and pressures and with varying amounts of catalyst. In each instance the hydrogenation was made in a glass bottle, which after addition of the aqueous malic acid solution and catalyst, was purged with nitrogen by four successive pressuring-depressurizing cycles. Thereafter the bottle was filled with hydrogen by four successive pressurizing-depressurizing cycles. The hydrogenation was started by shaking the mixture in the bottle at ambient temperature and heating, when indicated, to the desired reaction temperature. The pressure indicated was the initial pressure of hydrogen introduced in the reducer. The analysis of the reduced mixture for unsaturated acids was done polargraphically. The results are given in Table I below:

TABLE I

| Ex. | Catalyst Amount, Percent [1] | Pressure, p.s.i. | Temp., degrees | Time, hrs. | Percent Unsaturated Acids in Reduced Mass |
|---|---|---|---|---|---|
| 2 | 2.5 | 50 | 30 | 8 | 0.01 |
| 3 | 1.2 | 52 | 27 | 5 | <0.01 |
| 4 | 0.12 | 50 | 30 | 3 | <0.01 |
| 5 | 0.012 | 50 | 30 | 4 | 0.02 |
| 6 | 0.12 | 50.5 | 32 | 4.25 | [2] <0.01 |

[1] Based on Total Acids.
[2] Solution contained originally 1.34% unsaturated acids part of which was present as a finely divided crystalline phase, which disappeared during the hydrogenation.

EXAMPLES 7-10

A series of hydrogenations similar to those of Examples II–VI were run in a stainless steel reactor in place of the glass bottle. The same malic acid solution used in Examples II–VI was employed and the hydrogenations were carried out in the same manner as in Examples II–VI except as noted in Table II below wherein the results obtained in this series of experiments are described.

TABLE II

| Ex. | Catalyst Amount, Percent | Pressure, p.s.i. | Temp., degrees | Time, hrs. | Percent Unsaturated Acids in Reduced Mass |
|---|---|---|---|---|---|
| 7 | 0.42 | 100 | 30 | 6 | <0.01 |
| 8 | 0.42 | 150 | 30 | 2 | <0.01 |
| 9 | 0.21 | 150 | 30 | 2 | <0.01 |
| 10 | 0.21 | 150 | 28 | 3 | <0.01 |

EXAMPLE 11

To a solution, 1000 parts by volume, of crude malic acid containing 0.43% of unsaturated acids and 53.07% total acids, in a 2000 part by volume glass flask, 0.5% of 5% palladium on charcoal catalyst (based on total acids) was added. The mixture was agitated and hydrogen bubbled into the mixture for 9 hours, while maintaining the temperature at 27° to 30°. Analysis of the resultant mixture by polarograph indicated that it contained less than 0.01% of unsaturated acids.

It can thus be seen that an efficient and economical procedure has been provided for eliminating substantially completely objectionable unsaturated acids from malic acid. The malic acid thus produced contains about 0.5 to about 5% by weight of succinic acid. Further, this process provides malic acid which contains substantially no maleic acid and substantially no fumaric acid, both exceedingly undesirable contaminants of malic acid; maleic acid, being highly toxic to warm-blooded animals, and fumaric acid, being relatively insoluble in water, limit the utility of malic acid containing even minor quantities thereof.

My invention has been described and illustrated by reference to specific embodiments thereof. While the illustrative examples include the preferred procedures, it should be noted that variations of this procedure are feasible and that many such variations will be obvious to those skilled in this art in view of the disclosures contained herein.

I claim:

1. A malic acid composition suitable for use as a food acidulant consisting essentially of malic acid and from about 0.5 to 5% by weight of succinic acid, said composition containing not more than 0.03% by weight of maleic and fumaric acids based on the weight of malic acid.

2. A composition as defined in claim 1 wherein succinic acid is present in an amount of 0.5% to 3% by weight.

3. A process for preparing malic acid substantially free of unsaturated acids which comprises heating at a temperature of above about 150° C. and superatmospheric pressure an aqueous solution of at least one acid selected from the group which consists of maleic acid and fumaric acid to form malic acid, concentrating the resultant mixture to precipitate fumaric acid, separating the thus-obtained precipitate from the solution, subjecting the resulting solution to hydrogenation in the presence of a metal hydrogenation catalyst under conditions to convert maleic and fumaric acids present therein to succinic acid, and recovering malic acid from the resulting solution.

4. A process as defined in claim 3 wherein said hydrogenation is carried out at a temperature of about 25° C. to 60° C., at a pressure of about 40 to 150 p.s.i.

5. A process as defined in claim 4 wherein said hydrogenation catalyst is palladium on charcoal and is used in an amount of about 0.1 to 10% by weight of the malic acid solution subjected to hydrogenation.

6. A process as defined in claim 3 wherein after separating the fumaric acid from the solution, the solution contains at least 50% by weight of malic acid and up to about 5% by weight of unsaturated acid.

7. A process for preparing malic acid substantially free of unsaturated acids which comprises heating a concentrated aqueous solution of at least one acid selected from the group consisting of maleic acid and fumaric acid under superatmospheric pressure to a temperature of about 150° C. to form a mixture of malic acid, fumaric acid and maleic acid, concentrating the resulting mixture to precipitate fumaric acid, separating the thus-obtained fumaric acid precipitate from the solution, contacting the resulting solution of malic acid and a minor amount of maleic acid and fumaric acid with hydrogen in the presence of a metal hydrogenation catalyst at a temperature of about 25° C. to 60° C. and a pressure of about 40 to 150 p.s.i., removing said hydrogenation catalyst, and recovering malic acid substantially free of unsaturated acid.

8. In a process of preparing malic acid by hydrating in an aqueous solution at least one member of the group which consists of maleic acid and fumaric acid to convert said member to malic acid, separating fumaric acid and removering malic acid therefrom, the improvement which comprises contacting the aqueous solution after the hydration reaction with hydrogen in the presence of a metal hydrogenation catalyst at a temperature up to 100° C. to convert maleic acid and fumaric acid present in said solution to succinic acid.

9. A process for obtaining malic acid containing less than 0.03% by weight of unsaturated acid which comprises contacting an aqueous solution containing malic acid contaminated with minor quantities of fumaric acid and maleic acid with hydrogen in the presence of a metal hydrogenation catalyst.

10. A process as defined in claim 9 wherein said aqueous solution contains at least 30% by weight of malic acid and up to 5% by weight of a mixture of fumaric and maleic acid.

11. A process as defined in claim 9 wherein said aqueous solution contains about 30% to 80% by weight of malic acid and about 0.2% to 5% by weight of a mixture of fumaric and maleic acid.

12. A process as defined in claim 9 wherein said solution is contacted with hydrogen at a temperature of about 25° C. to 100° C. at a pressure of about 40 to 150 p.s.i. and wherein said catalyst is palladium on charcoal.

References Cited

UNITED STATES PATENTS

| | | | |
|---|---|---|---|
| 2,463,962 | 3/1949 | Gorcica et al. | 99—79 |
| 3,371,112 | 2/1968 | Winstrom et al. | 260—535 |
| 3,379,756 | 4/1968 | Ahlgren | 260—535 |
| 3,379,757 | 4/1968 | Winstrom et al. | 260—535 |
| 3,391,187 | 7/1968 | Cullen et al. | 260—535 |

RAYMOND N. JONES, Primary Examiner

S. B. DAVIS, Assistant Examiner

U.S. Cl. X.R.

260—535, 537